June 9, 1931. A. W. KILE 1,809,711
AUXILIARY MUD GUARD FOR AUTOMOBILE FENDERS
Filed Sept. 12, 1930

INVENTOR
ALFRED W. KILE
BY Paul, Paul Hilary
ATTORNEYS

Patented June 9, 1931

1,809,711

UNITED STATES PATENT OFFICE

ALFRED W. KILE, OF MINNEAPOLIS, MINNESOTA, ASSIGNOR TO DURKEE-ATWOOD COMPANY, OF MINNEAPOLIS, MINNESOTA, A CORPORATION OF MINNESOTA

AUXILIARY MUDGUARD FOR AUTOMOBILE FENDERS

Application filed September 12, 1930. Serial No. 481,408.

This invention relates to new and useful improvements in auxiliary mud guards for automobile fenders, adapted to cooperate therewith to prevent splashing of mud, road oil, and other foreign material onto the body of the vehicle.

An object of the invention is to provide an auxiliary mud guard adapted for use in connection with a vehicle wheel fender, comprising a semi-rigid body portion having means for attaching it in operative position adjacent to the fender.

A further object is to provide an auxiliary mud guard of the class described, comprising a semi-rigid body portion of flat material having means thereon for adjustably securing it to a fender whereby it may be relatively adjusted with respect thereto so that the guard may be positioned to form a pleasing continuation of the contour of the fender.

A further and more specific object is to provide such a device comprising a body portion of a resilient, unbreakable material, such as rubber, forming an auxiliary mud or splash guard for an automobile fender, and having cooperating clamping members attached thereto and formed with hook-shaped ends adapted to clampingly engage an edge of a fender to adjustably secure the guard thereto, said clamping members being adapted for longitudinal adjustment relatively to each other to permit angular adjustment of the guard with respect to the fender, and said clamping members permitting the auxiliary guard to be secured to the fender without the necessity of drilling holes in the fender or otherwise marring it.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Figure 1:
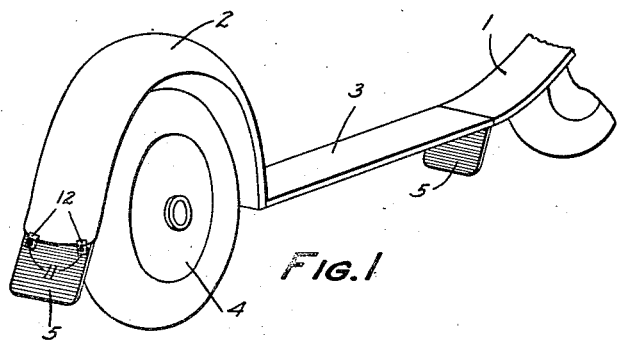
Figure 1 is a perspective view illustrating a portion of an automobile with the invention applied to the fenders thereof.

In the selected embodiment of the invention here shown, there is illustrated in Figure 1, a portion of an automobile comprising the usual front and rear fenders 1 and 2, running board 3, and rear wheel 4.

Figure 2:
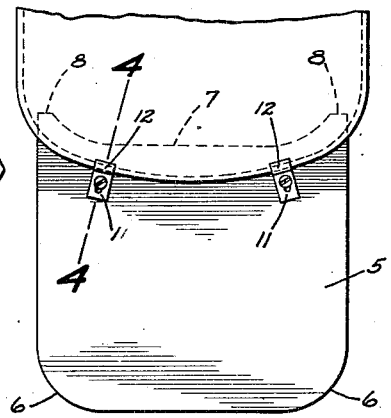
Figure 2 is a view showing a guard attached to a rear fender.

The novel splash guard featured in this invention comprises a semi-rigid body portion 5 of a suitable material such, for example, as rubber, preferably having its lower corners rounded as indicated at 6 in Figure 2. The upper edge of the guard is preferably shaped as indicated by the dotted line 7 in Figure 2, so as to provide projections 8 adapted to project under the fender, whereby the upper corners of the auxiliary guard will be concealed when it is attached to the rear end portion of a rear fender, as shown in Figure 2.

Figure 4:
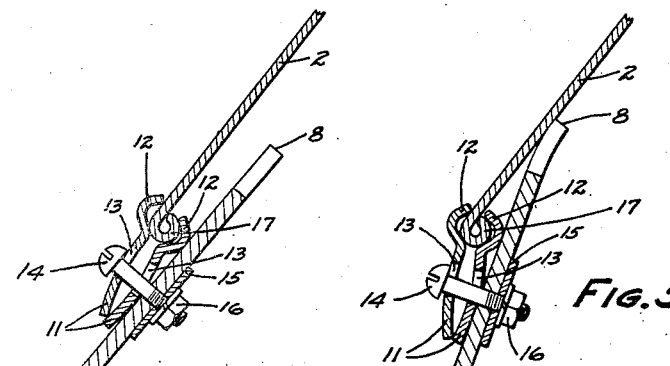
Figure 4 is an enlarged detail sectional view on the line 4—4 of Figure 2, showing the guard attached to the rear edge of a fender.
Figure 3:
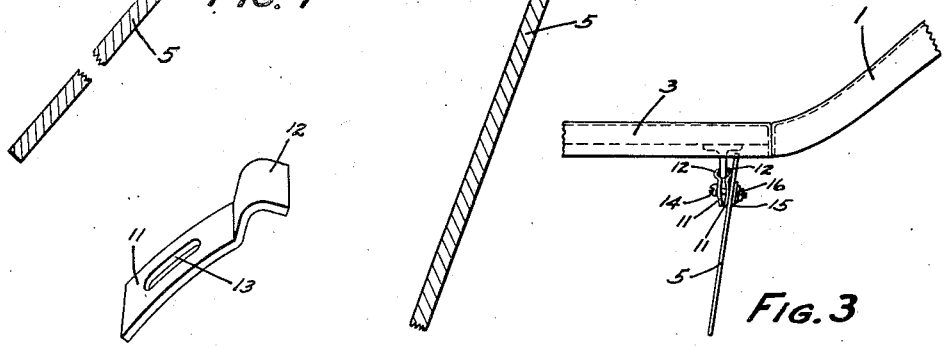
Figure 3 is a detail view showing a manner of attaching the guard in operative position adjacent to a front fender.
Figure 6:
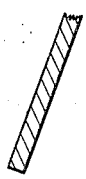
Figure 6 is a perspective view showing one of the clamping members detached from the guard.

The means for attaching the guard to the fender is best shown in Figures 3 and 4, and comprises a pair of clamping members 11, preferably similar in form, and each shown provided with an elongated aperture 13 adapted to be traversed by a suitable bolt 14, received in an aperture provided in the body portion of the guard. The bolt 14 is shown provided with a washer 15 and nut 16 whereby the clamping members 11 may be drawn tightly together to grip the edge 17 of the fender, as shown in Figures 3 and 4. Two sets of clamping members are provided for each guard, as shown in Figures 1 and 2, whereby the guards may be securely attached to the fenders.

Figure 5:
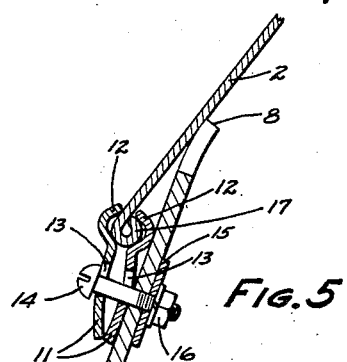
Figure 5 is a similar view showing the guard adjusted to a different position from that shown in Figure 4.

The clamping members 11 provide means whereby the position of the guard with respect to the fender may be relatively adjusted so that the guard may be positioned to form a pleasing continuation of the contour of the fender, as will be noted by reference to Figure 1. By longitudinally adjusting the positions of the clamping members with respect to each other, the guard may be quickly adjusted from one position to another, as will be noted by reference to Figures 4 and 5. The guard may also be quickly removed from the fender by simply releasing the clamping members 11 which, it will be noted, are provided with hooked end portions 12 adapted to grip the edge 17 of the fender. By thus shaping the ends of the clamping members, the guard cannot accidentally become detached from the fender, when the bolt 14 has been properly tightened. In the drawings, I have shown the guard attached to a fender having a rolled or beaded edge.

An important feature of the invention resides in the construction of the clamping members, whereby the guard may be quickly attached to a fender in a position to form a continuation of the contour thereof. The clamping members also provide means whereby the guard may be attached to various types and shapes of fenders without requiring any alteration or modification thereof, and without having to drill holes in the fender, or otherwise marring it. The fenders need not necessarily have a beaded edge, as shown in the drawings, to support the auxiliary mud guards.

When the guard is to be used in connection with the front fender of an automobile, it may be secured to the brace member 18, usually provided at the forward portion of the running board in a position to depend therefrom, as shown in Figure 3.

By constructing the body of the auxiliary mud guard of a semi-rigid material, such as rubber, having the inherent characteristics of being resilient and non-breakable, the guard is not likely to become damaged, should it engage a curb or other obstruction. Engagement of the guard with an obstruction may cause the body portion thereof to bend, but the resiliency of the material will cause it to return to its normal position, when released from the obstruction. The shape of the body portion of the guard is such that it may be punched from sheet material substantially without waste, thereby providing a device which may be manufactured at a very low cost.

I claim as my invention:

1. A splash guard comprising a semi-rigid body portion of unbreakable material, and clamping elements on said body portion adapted to engage an edge portion of an automobile fender to secure said body portion at any desired angle with respect to said fender at such points of attachment.

2. A splash guard comprising a semi-rigid body portion of unbreakable material, and clamping elements on said body portion adapted to engage the rear transverse edge of an automobile fender to secure said body portion at any desired angle with respect to said fender.

3. A splash guard comprising a flap of yieldable and unbreakable material having sufficient rigidity to normally maintain the flap in substantially one plane when supported from points adjacent its edge, and clamping elements on said flap adapted to engage the rear transverse edge of an automobile fender to secure said flap at any desired angle whereby it will form a pleasing continuation of the contour of the fender.

4. A splash guard comprising a semi-rigid body portion of unbreakable material, clamping elements on said body portion adjacent to but spaced from an edge thereof, said clamping elements being adapted to engage the rear transverse edge of an automobile fender to secure said body portion at any desired angle with respect to said fender and with an end portion of said body portion disposed beneath said fender.

5. A splash guard comprising a semi-rigid body portion of unbreakable material, fastening elements on said body portion adjacent to but spaced from an edge thereof, said fastening elements including clamping jaws positioned on one face of said body portion and lying wholly within the area bounded by the periphery of said body portion, said clamping jaws being adapted to engage the rear transverse edge of an automobile fender to hold said body portion at any desired angle with respect to the fender.

In witness whereof I have hereunto set my hand this 9th day of September 1930.

ALFRED W. KILE.